United States Patent
Harkness et al.

[11] Patent Number: 5,861,468
[45] Date of Patent: Jan. 19, 1999

[54] CURABLE SILOXANE POLYMER COMPOSITION AND METHOD OF CURING

[75] Inventors: Brian Robert Harkness, S. Glamorgan, United Kingdom; Mamoru Tachikawa; Kasumi Takeuchi, both of Kanagawa, Japan

[73] Assignee: Dow Corning Asia, Ltd., Tokyo, Japan

[21] Appl. No.: 566,031

[22] Filed: Dec. 1, 1995

[30] Foreign Application Priority Data

Dec. 2, 1994 [JP] Japan .................................. 6-299507

[51] Int. Cl.$^6$ .................................................. C08G 77/08
[52] U.S. Cl. ................................ 528/19; 528/35; 528/37; 528/40; 528/14; 428/447; 428/450
[58] Field of Search .................................. 528/14, 19, 35, 528/37, 40; 428/447, 450; 556/453, 455, 434, 431, 450

[56] References Cited

U.S. PATENT DOCUMENTS

| | | | |
|---|---|---|---|
| 3,178,392 | 4/1965 | Kriner | 528/35 |
| 3,387,015 | 6/1968 | Piccoli | 528/35 |
| 3,719,696 | 3/1973 | Jonas et al. | 528/35 |
| 5,001,187 | 3/1991 | Liles et al. | 524/745 |
| 5,049,611 | 9/1991 | Baney et al. | 524/588 |
| 5,516,871 | 5/1996 | Harkness et al. | 528/18 |
| 5,610,259 | 3/1997 | Cella et al. | 528/27 |

OTHER PUBLICATIONS

Doklady Akademii Nauksssr, vol. 208, No. 5 pp. 1112–1115, Feb. 1973—Translation.

*Primary Examiner*—Margaret W. Glass
*Attorney, Agent, or Firm*—Robert L. McKellar

[57] ABSTRACT

A curable polysiloxane of formula $$A_a B_b (R_3SiO_{0.5})_c (R_2SiO)_d (RSiO_{1.5})_e (SiO_2)_f$$

where A and B are silacyclobutane, disilacyclobutane or benzosilacyclobutene functional groups. A composition of matter comprising this polysiloxane and a copper, silver or gold containing catalyst. A method of curing this polysiloxane.

3 Claims, No Drawings

CURABLE SILOXANE POLYMER COMPOSITION AND METHOD OF CURING

FIELD OF THE INVENTION

The present invention concerns a curable siloxane polymer composition and a method of forming a cured material from this polymer. More specifically, the present invention concerns a curable siloxane polymer composition and a method for forming a cured material from this polymer without producing cure by-products and by using a catalyst selected from the group consisting of metallic copper, a copper alloys, copper compounds, silver compounds and gold compounds.

DESCRIPTION OF THE RELATED ART

Curable silicones include both one and two part liquid curable silicone rubbers and silicone resins. These materials have industrial significance due to their use as formable and curable materials. Methods of curing silicones include radical crosslinking reactions using peroxide, hydrosilylation crosslinking reactions between Si—H groups and alkenyl groups, silanol condensation reactions, silanol/alkoxysilane condensation reactions, silanol/acetoxysilane condensation reactions, photoaddition reactions between thiol and alkenyl groups, photopolymerization reactions using methacryl groups or acrylic groups and crosslink formation by means of photoacid catalysts and epoxy groups.

There are disadvantages associated with these conventional methods of curing siloxanes. Some conventional methods of curing siloxanes produce cure by-products. These reaction mechanisms include radical crosslinking reactions, silanol condensation reactions, silanol/alkoxysilane condensation reactions and silanol/acetoxysilane condensation reactions. There are, however, conventional methods of curing siloxanes that do not generate cure by-products. These methods include hydrosilylation reactions and photocrosslinking reactions. Hydrosilylation reactions require the use of extremely costly precious metal catalysts and have problems with small amounts of impurities causing a deterioration in curing properties. Moreover, hydrosilylation methods, which are restricted by the catalyst and reaction temperature, do not allow partial selectivity pertaining to curing. Photocrosslinking reactions include photoaddition reactions between thiol and alkenyl groups, photopolymerization reactions using methacryl groups or acrylic groups and crosslinking reactions using photoacid catalysts and epoxy groups. Problems with siloxane materials that cure via photocrosslinking reactions include high cost due to costly reactants, odor, corrosion and poor thermal stability. Although photocrosslinking reactions can provide partial selectivity with respect to the curing parts, a crosslinking reaction that provides curing specific to the base material that is in contact with the curable composition has not, heretofore, been known.

In U.S. Pat. No. 5,049,611, issued on Sep. 17, 1991, Baney et al. disclose silacyclobutane functional polydiorganosiloxane copolymers that cure, in the presence of platinum catalysts, via hydrosilylation reactions.

Silacyclobutanes and disilacyclobutanes are known to undergo ring-opening by means of copper compounds. Polycarbosilanes produced by ring-opening polymerization were reported by Poletaev, Vdovin, and Nametkin in *Dolk. Akad. Nauk SSSR,* (1973) (5), 208, 1112.

One objective of the present invention is to offer a curable siloxane polymer composition that does not require the use of platinum, rhodium, or other costly precious metal compounds as the curing agent. Another object is to offer a method for forming a cured material composed of this polymer. It is also an object of the present invention to provide a curable siloxane polymer that 1) can be cured using a catalyst that is more resistant to catalytic poisoning than conventional catalyst like platinum, rhodium and other precious metal compounds and 2) is inactive with respect to a large number of unsaturated groups. Another object of the present invention is to offer a material that is cured in a material-specific manner at the surface of a metallic copper or a copper alloy.

Although it is well-known that silacyclobutane and disilacyclobutane compounds undergo ring-opening polymerization in the presence of copper catalysts, the present inventors discovered that silacyclobutane and disilacyclobutane functional groups bonded to polysiloxane also undergo ring-opening polymerization in the presence of copper compounds. The present inventors also discovered that when a monovalent, divalent or trivalent copper compound, metallic copper, a copper alloy, a monovalent or divalent silver compound, or a monovalent or trivalent gold compound is dispersed in the polysiloxane of the present invention, and this composition is heated, the silacyclobutane and disilacyclobutane functional groups undergo ring-opening polymerization, and crosslinking is thereby produced between the polysiloxane molecules, thus curing the polysiloxane. The above mentioned copper, silver and gold catalysts can be added to the polysiloxane of the present invention in open air. Unlike styrene or olefin polymerization reactions that are carried out with anionic polymerization or Ziegler-Natta catalysts, the polymerization reactions of the present invention are not subjected to loss of catalytic activity due to contact with water or atmospheric oxygen. Thus the metallic copper, copper alloy, or compound of copper, silver or gold that is used as the catalyst can be added in a stable form in open air or in the silacyclobutane or disilacyclobutane functional polysiloxane of the present invention. Catalytic activity is initiated by heating the silacyclobutane or disilacyclobutane polysiloxane containing the catalyst compound. Curing of the polysiloxane occurs by this means.

SUMMARY OF THE INVENTION

The present invention pertains to silacyclobutane functional polysiloxanes and disilacyclobutane functional polysiloxanes having the general formula $$A_aB_b(R_3SiO_{0.5})_c(R_2SiO)_d(RSiO_{1.5})_e(SiO_2)_f$$

where both A and B are selected from the group consisting of certain silacyclobutane, disilacyclobutane and benzosilacyclobutene functional groups. The formula expressed above is designated as general formula I. The present invention also pertains to the curing of these polysiloxanes.

DETAILED DESCRIPTION OF THE INVENTION

The present invention is a composition of matter comprising a curable siloxane polymer having the general formula $$A_aB_b(R_3SiO_{0.5})_c(R_2SiO)_d(RSiO_{1.5})_e(SiO_2)_f$$

where A is selected from the group consisting of I) compounds having the general formula

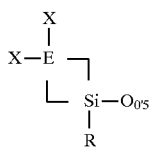

and II) compounds having the general formula

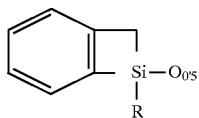

B is selected from the group consisting of III) compounds having the general formula

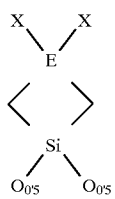

IV) compounds having the general formula

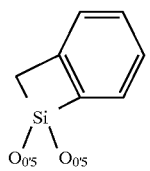

and V) compounds having the general formula

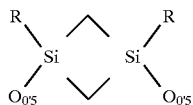

where each R is individually selected from the group consisting of saturated and unsaturated hydrocarbon groups having 1 to 6 carbon atoms, E is selected from the group consisting of a silicon atom and a carbon atom, X is selected from the group consisting of methyl and phenyl groups when E is a silicon atom, and from the group consisting of a methyl group or hydrogen atom when E is a carbon atom, the sum of a, b, c, d, e, and f is greater than or equal to 3, the sum of a and b is greater than or equal to 2, and the average content ratios of monomer units with respect to polymer molecule are within the following ranges: $0.8 \geq a/(a+b+c+d+e+f) \geq 0$; $1.0 \geq b/(a+b+c+d+e+f) \geq 0$; $0.5 \geq c/(a+b+c+d+e+f) \geq 0$; $1.0 > d/(a+b+c+d+e+f) \geq 0$; $1.0 > e/(a+b+c+d+e+f) \geq 0$; $0.65 > f/(a+b+c+d+e+f) \geq 0$.

The curable siloxane of the present invention has at least one cyclic functional group and is cured by a polymerization reaction using a metal, alloy or compound selected from metallic copper, copper alloys, copper compounds, silver compounds and gold compounds as the catalyst.

The present invention also includes a method curing the polysilxoanes of general formula I, comprising the steps of A) mixing 1) a curable siloxane polymer having the general formula $$A_a B_b (R_3SiO_{0.5})_c (R_2SiO)_d (RSiO_{1.5})_e (SiO_2)_f$$

where A, B, X, E, R, a, b, c, d, e, and f are as described above; with 2) a catalyst selected from the group consisting of metallic copper, copper alloys, copper compounds, silver compounds, gold compounds and mixtures thereof; and B) heating the resulting mixture for a sufficient time and at a sufficient temperature to cure said mixture.

The present invention also includes a method of curing comprising the steps of A) contacting 1) a siloxane polymer having the general formula $$A_a B_b (R_3SiO_{0.5})_c (R_2SiO)_d (RSiO_{1.5})_e (SiO_2)_f$$

where A, B, X, E, R, a, b, c, d, e, and f are as described above; with 2) a metal layer selected from the group consisting of metallic copper layers, copper alloy layers, and copper compound layers; and B) heating the curable siloxane polymer for a sufficient time and at a sufficient temperature to cure the polymer.

The present invention also includes a cured siloxane prepared by A) mixing 1) a siloxane polymer having the general formula $$A_a B_b (R_3SiO_{0.5})_c (R_2SiO)_d (RSiO_{1.5})_e (SiO_2)_f$$

where A, B, R, X, E, a, b, c, d, e, and f are as described above; with 2) a catalyst selected from the group consisting of metallic copper, copper alloys, copper compounds, silver compounds and gold compounds; and B) heating the mixture for a sufficient time and at a sufficient temperature to form a cured siloxane.

An important fact concerning the siloxane structural units of the present invention is that polysiloxanes of the present invention have at least two functional groups selected from the group consisting of silacyclobutane functional groups, disilacyclobutane functional groups and benzosilacyclobutene functional groups in each molecule. Thus, the essential backbone of said polymer molecules may be a linear siloxane composed only of D units and M units, a cyclic siloxane composed only of D units, a branched siloxane composed of M and T or M, D and T as structural components, a resin composed of M, D and Q or M and Q components, or a siloxane containing M, D, T and Q together. The term "M unit" denotes a monovalent functional group expressed by the general formula $R_3 SiO_{1/2}$, the term "D unit" denotes a divalent functional group expressed by the general formula $R_2SiO_{2/2}$, the term "T unit" refers to a trifunctional group expressed by the general formula $RSiO_{3/2}$, and the term "Q unit" refers to a tetravalent functional group expressed by the general formula $SiO_{4/2}$.

The silacyclobutane functional groups of the present invention include, but are not limited to, monovalent silyl groups and divalent silylene groups. Examples of monovalent silyl groups that may be used as silacyclobutane functional groups in the present invention, include, but are not limited to methyl(trimethylene)silyl groups, phenyl (trimethylene)silyl groups, vinyl(trimethylene)silyl groups, methyl(2-methyltrimethylene)silyl groups, and phenyl(2-methyltrimethylene)silyl groups. Examples of divalent silylene groups that may be used as silacyclobutane functional groups in the present invention, include, but are not limited to trimethylenesilylene groups and 2-methyltrimethylenesilylene groups.

The benzosilacyclobutene functional groups of the present invention include but are not limited to functional groups having the general formula

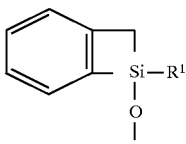

where $R^1$ is a methyl, vinyl or phenyl group.

The disilacyclobutane functional groups of the present invention include, but are not limited to monovalent silyl groups, divalent silylene groups and bifunctional groups having the general formula

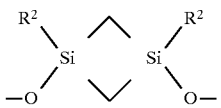

where each $R^2$ is independently selected from the group consisting of vinyl and phenyl groups. Examples of monovalent silyl groups having a disilacyclobutane structure include but are not limited to methyl(2,2-dimethyl-2-silatrimethylene)silyl groups, phenyl(2,2-dimethyl-2-silatrimethylene)silyl groups, vinyl(2,2-dimethyl-2-silatrimethylene)silyl groups, methyl(2,2-diphenyl-2-silatrimethylene)silyl groups, and phenyl(2,2-diphenyl-2-silatrimethylene)silyl groups. Examples of divalent silylene groups having disilacyclobutane structures include, but are not limited to (2,2-dimethyl-2-silatrimethylene)silylene groups and (2,2-diphenyl-2-silatrimethylene)silylene groups.

Catalyst that can be used to cure the silacyclobutane, disilacyclobutane and benzosilacyclobutene functional polysiloxanes of the present invention include substances selected from the group consisting of copper, copper alloys, or compounds of metals from Group 11 of the periodic table. These compounds include monovalent, divalent and trivalent compounds of copper, monovalent and divalent compounds of silver and monovalent and trivalent compounds of gold. The metals, alloys and compounds that are usable as catalysts in the present invention may be soluble or insoluble in the siloxane polymer expressed by general formula I.

Examples of copper compounds that may be used as catalysts in the present invention include, but are not limited to, oxides and hydroxides of copper, but there are no particular limitations on the copper compound, provided that the compound can exhibit the essential catalytic capacity. Additional examples of copper compounds that may be used as catalysts in the present invention include, but are not limited to, monovalent inorganic copper compounds such as cuprous chloride, cuprous bromide and cuprous oxide, monovalent organic copper compounds and complexes thereof such as trimethylsilylmethylcopper ($Me_3SiCH_2Cu$), cupric chloride, cupric bromide, cupric oxide, copper nitrate, copper sulfate, cupric acetate, copper naphthenate, copper (II) oleate, copper(II) acetylacetonate, bisethylenediaminecopper(II) chloride, tetraaminecopper (II) sulfate and other divalent copper compounds and complex compounds thereof.

Any metallic copper, copper-plated surface or copper alloy may be used as a catalyst in the present invention. Examples of metallic coppers that may be used as catalysts in the present invention include, but are not limited to, copper plates, copper foil, copper film, copper powder, copper wire and copper filament. Acceptable examples of copper plating include plating formed on other metal surfaces, on organic solids such as plastics or on inorganic solid surfaces such as glass. Examples of copper alloys that may be used as catalysts in the present invention, include, but are not limited to yellow copper (brass), gun metal (blue copper), Monel metal, Constantan or any other copper alloy in any form.

Copper compound layers of the present invention include, but are not limited to, solids composed of copper compounds, thin-film materials formed on the surface of metallic copper or copper alloys, and materials produced by forming a thin film on the surface of a solid other than copper.

Examples of monovalent silver compounds that may be used as catalysts in the present invention include, but are not limited to, oxides, halides, sulfides, sulfates, nitrates, carbonates, perchlorates, carboxylates and complexes thereof. Additional examples include organic silver compounds and complexes thereof.

Examples of gold compounds that may be used as catalysts in the present invention include, but are not limited to, monovalent and trivalent gold chloride, gold bromide, gold iodide, gold cyanide, chloroauric acid, bromoauric acid, cyanoauric acid and salts of these acids, monovalent organic gold compounds and complexes thereof, monovalent gold compounds having sulfur-containing ligands, complexes thereof, and monovalent and trivalent gold oxide.

The amount of catalyst that is required to cure the silacyclobutane, disilacyclobutane or benzosilacyclobutene functional polysiloxanes of the present invention depends upon such factors as the activity of the catalyst, the curing temperature, the reactivity of the crosslinking functional groups, the amount of catalyst poisoning substance present and the desired curing rate. Generally, it is appropriate to add from 1 to 1,000 ppm of the catalyst to the curable composition. Compositions containing 5 to 200 ppm are preferred. Compositions containing less than 5 ppm cure slowly while compositions cured using more than 200 ppm tend to exhibit such problems as discoloration due to catalyst residue and decreased physical characteristics, such as thermal stability and electrical characteristics.

When the silacyclobutane, disilacyclobutane or benzosilacyclobutene functional polysiloxanes of the present invention come into contact with metallic copper, copper alloys or copper compounds, the copper that is in contact with polysiloxanes has a catalytic action. It is thought that the copper atoms or copper compound at the solid surface also exhibit catalytic activity.

The temperature at which curing of the silacyclobutane, disilacyclobutane or benzosilacylcobutene functional polysiloxanes occurs varies depending on the cyclic functional groups, the amount of catalyst used, the curing time and the characteristics of the copper surface. Temperatures of 50° C. or greater generally produce activity in the catalysts of the present invention. Any temperature above this level can be used, but it is preferable to use a temperature of 100° C. or greater and 350° C. or less in consideration of the curing time and the thermal stability of the silicone cured material and functional groups.

The curing time varies with the type and amount of catalyst and the curing temperature, and can be adjusted depending on the objectives and applications pertaining to the final material. A heating time of 1 second to 5 minutes is ordinarily used, with 5 seconds to 1 minute being preferred. The variables can be adjusted so that the process is carried out instantaneously, over a long period of time, or after a determinate period of time has passed.

By means of the present invention, it is possible to produce a curable silicone that does not generate by-products during the crosslinking reaction and does not require the use of costly platinum, rhodium or other precious metal compounds as curing catalysts. In comparison to catalysts such as platinum and rhodium, the metals, alloys and compounds that are usable as catalysts in the present invention are neither readily poisoned by small quantities of impurities nor active with respect to a large number of unsaturated groups. As a result, functional groups such as alkenyl groups and carbonyl groups can be present in the cured composition of the present invention without a loss of curing properties, unlike silicones that are cured by hydrosilylation reactions using catalysts such as platinum and rhodium.

In one configuration of the present invention, it is possible to offer a material that cures in a material-specific manner (copper) at the surface of a metallic copper, copper alloy or copper compound layer. In addition, the curing reaction that occurs on these metals occurs directly through the insulation of the wiring in electronic devices.

EXAMPLES

The present invention is described in additional detail below using application examples and reference examples, but the present invention is not limited to these examples.

In the following descriptions concerning the physical characteristics of the products obtained in the examples described below, the terms $^1$H—NMR, $^{13}$C($^1$H)—NMR and $^{29}$Si($^1$H)—NMR refer to proton NMR spectra, carbon-13 NMR spectra (proton-decoupled) and silicon-29 NMR spectra (proton-decoupled), respectively. CDCl$_3$ refers to deuterochloroform, and the terms s, d, t, m and br enclosed in the parentheses shown in the proton NMR spectra data refer to singlet, doublet, triplet, multiplet and broad forms. The terms 1H, 2H and 3H denote spectral intensity ratios of 1, 2 and 3 respectively. The chemical shifts of the nuclear magnetic resonance spectra are values obtained taking tetramethylsilane as 0 ppm. GC-MS refers to mass spectroscopy coupled with gas chromatography, and GPC refers to gel permeation chromatography.

Reference Example 1 (Hexaphenyltrisiloxane-1,5-diol)

400 parts tetrahydrofuran and 55 parts hexaphenylcyclotrisiloxane were added to an Erlenmeyer flask, and dissolution was brought about. 3 parts hexylamine and 40 parts water were then added, and stirring was carried out for 30 minutes at room temperature. Conversion to the diol was confirmed by thin-layer chromatography, and the reaction solution was poured into 500 parts water and neutralized with dilute hydrochloric acid. The organic substance was precipitated with 600 parts of toluene, and this precipitate was repeatedly washed with water. Dehydration was then carried out with anhydrous sodium sulfate, and after filtration, the filtrate was condensed to 150 parts with a rotary evaporator. Hexane was then added to obtain crystals of hexaphenyltrisiloxane-1,5-diol in a yield of 93%.

Analysis of hexaphenyltrisiloxane-1,5-diol

The melting point of the hexaphenyltrisiloxane- 1,5-diol was 110°–111° C. An absorption was found at 3244 cm$^{-1}$, as determined by the infrared absorption spectrum.

Reference Example 2 (DT resin polyol synthesis)

20 grams of diphenylsilanediol and 40 ml of toluene were introduced into a 300-ml three-neck flask, and a mixture of 10 grams of methyltrichlorosilane and 10 grams of pyridine were slowly added dropwise while stirring well. After the dropwise addition, the reaction product was stirred for 30 minutes, and to this product was added a mixture of water (40 ml) and toluene (40 ml), whereupon stirring was carried out for an additional 30 minutes. The organic layer was separated and washed repeatedly with water. Dehydration was then carried out with anhydrous sodium sulfate, and after filtration, the solvent was removed with a rotary evaporator to obtain DT resin polyol in a yield of 97%.

Analysis of DT resin polyol

The molar ratio of the D to M components of the DT resin polyol was, as determined by $^1$H—NMR spectral analysis, 4:5. The polystyrene conversion molecular weight determined by GPC analysis gave a weight-average molecular weight of 3,000 and a number-average molecular weight of 900. Strong absorptions were found at 3640 cm$^{-1}$ and 3410 cm$^{-1}$ as determined by the infrared absorption spectrum.

Reference Example 3 (MQ resin polyol synthesis)

5 grams of MQ resin having trimethylsilyl groups and dimethylsilyl groups as M functional groups were introduced into a 100-ml roundbottom flask, and 0.15 grams of 5% palladium carried on activated charcoal, 2.5 grams of water and 47 grams of tetrahydrofuran were introduced. The mixture was heated under reflux for 5 hours. After the palladium-carrying activated charcoal was removed by filtration, the solvent was removed with a rotary evaporator, and MQ resin polyol was obtained in a yield of 90%.

Analysis of MQ resin polyol

The polystyrene conversion molecular weight of the MQ resin polyol, determined by GPC analysis, showed a weight-average molecular weight of 1,900 and a number-average molecular weight of 1,300. The infrared absorption spectrum showed a broad and strong absorption at 3320 cm$^{-1}$.

Reference Example 4 (Synthesis of methyl (cyclotrimethylene)silyl-terminated diphenylsiloxane oligomer)

13 grams of 1.65 mol n-butyllithium/L hexane solution were added to a substance produced by dissolving 8.5 grams of the hexaphenyltrisiloxane-1,5-diol obtained in Reference Example 1 in 30 grams of tetrahydrofuran, and a dilithium salt of hexaphenyltrisiloxane-1,5-diol was obtained. 1.5 grams of 1-chloro-1-methylsilacyclobutane were then added at ambient temperature, and heating and stirring were carried out for 2 hours at 65° C. The reaction mixture was then cooled to room temperature, and the resulting lithium salt was removed by filtration. The solvent was then evaporated under reduced pressure, and the residue was precipitated 3 times from 70 grams of hexane. The hexane was then removed with a rotary evaporator, and 8.6 grams of methyl (cyclotrimethylene)silyl-terminated oligo(diphenylsiloxane) were obtained.

Analytical results:

NMR: 1H—nmr (CDCl$_3$) 0.15 (s, 6H), 1. 1 (m, 8H), 1.58 (m, 2H), 2.20 (m, 2H), 7.2~7. 7 (m, 30H)○13C (1H)—nmr (CDCl$_3$, ppm): 0.75, 13. 5, 20. 5, 127. 9~135. 5○29Si (1H)—nmr (CDCl$_3$, ppm)-46. 2, 46. 0, 7.3○

Reference Example 5 (Synthesis of methyl (cyclotrimethylene)silyl-terminated dimethylsiloxane oligomer)

13 grams of 1.65 mol n-butyllithium/L hexane solution were added to a substance produced by dissolving 8.5 grams of dimethylsiloxanediol (average degree of polymerization: 4.2) in 30 grams of tetrahydrofuran to obtain a dilithium salt of dimethylsiloxanediol. 4.5 grams of 1-chloro-1-methylsilacyclobutane were then added at ambient temperature, and heating and stirring were carried out for 2 hours at 65° C. The reaction mixture was then cooled to room temperature, and the resulting lithium salt was removed by filtration. The solvent was then evaporated under reduced pressure, and the residue was precipitated 3 times from 70 grams of hexane. The hexane was then removed with a rotary evaporator, and 8.6 grams of methyl (cyclotri methylene)silyl-terminated oligo(dimethylsiloxane) were obtained.

Analytical results:

NMR: 1H—nmr (CDCl$_3$) 0.072~0.11 (m, 14.9H), 0.25 (s, 3H), 1.15 (m, 4H), 1.53 (m, 1H), 1.96 (m, 1H)○13C (1H) —nmr (CDCl$_3$, ppm): 0.30 (q, 1C) 0.90 (q, 5C)), 13.11 (t, 1C), 20.01 (t, 2C)○29 Si (1H)—nmr (CDCl$_3$, ppm): −21.8~−21.5, −20.2~−20.0, 5.01○

Reference Example 6 (Synthesis of silacyclobutane functional dimethylsiloxane polymer)

13 grams of triethylamine were added to a substance produced by dissolving 10 grams of dimethylsiloxanediol (average degree of polymerization: 11) in 30 grams of toluene. 4.5 grams of 1,1-dichlorosilacyclobutane were then added to this solution at room temperature, and after stirring, 3.0 grams of 1-chloro-1-methylsilacyclobutane were added, and the product was allowed to stand overnight at ambient temperature. The resulting ammonium salt was removed by filtration, and the solvent was removed under reduced pressure. The residue was then precipitated 3 times with 50 grams of hexane. The hexane was then removed with a rotary evaporator to obtain 11.6 grams of silacyclobutane functional dimethylsiloxane polymer.

Analytical results:

NMR: 1H—nmr (CDCl$_3$): 0.051 (17.8, s), 0. 060 (1.02, s), 0.093 (3.54, s), 0.25 (0.57, s), 1.2 (0.60, m), 0.32 (1.29, m), 0.65 (1.04, m), 1.90 (0.14, H)○29Si (1H)—nmr (CDCl$_3$, ppm): −36.2 (1.257), −21.88 (13.16), −21.59 (3.67), −20.76 (2.24) −20.0 (0.747), 5.059 (0.608)○

The polystyrene conversion molecular weight determined by GPC analysis gave a weight-average molecular weight of 9,600 and a number-average molecular weight of 5,070.

Reference Example 7 (Synthesis of methyl (cyclotrimethylene)silyl-group-modified DT resin)

A solution, produced by dissolving 1 gram of triethylamine and 1 gram of 1-chloro-1-methylsilacyclobutane in 5 ml of toluene, was added over 20 minutes to a solution produced by dissolving 2.5 grams of DT resin polyol obtained in Reference Example 2 in 10 ml of toluene. Heating and stirring were then carried out for 2 hours at 65° C., and the reaction mixture was cooled to room temperature before the ammonium salt was removed by filtration. The solvent was then eliminated from the filtrate under reduced pressure, and the residue was precipitated 3 times from 20 ml of hexane. The hexane was eliminated with a rotary evaporator to obtain 2.8 grams of methyl(cyclotrimethylene)silyl-group-modified DT resin.

Analytical results:

NMR: 3H—nmr (CDCl$_3$): −0.5~+0.4 (14 2.68, br), 0.8~0.3 (37.92, br), 1.4~1.7 (11.8, br), 1.7~2.1 (11.08, br), 6.8~7.8 (344.476, br) 29Si (1H)—nmr (CDCl$_3$, ppm): −62~69 (115.07, br), −56~−59 (25.97, br), −43~49 (97.93, br), −34~−37 (18.98, br), 5~9 (35.68, br The polystyrene conversion molecular weight determined by GPC analysis gave a weight-average molecular weight of 3,500 and a number-average molecular weight of 1,100.

Reference Example 8 (Synthesis of methyl (cyclotrimethylene)silyl-group-modified MQ resin)

A solution, produced by dissolving 1 gram of triethylamine and 1 gram of 1-chloro-1-methylsilacyclobutane in 5 ml of toluene, was added over 20 minutes to a solution produced by dissolving 1 gram of the MQ resin polyol obtained in Reference Example 3 in 10 ml of toluene, and the mixture was heated and stirred for 2 hours at 65° C. The reaction mixture was cooled to room temperature, and the resulting ammonium salt was removed by filtration. The solvent was then removed from the filtrate under reduced pressure, and the residue was washed 3 times with 20 ml of hexane. The hexane was then removed with a rotary evaporator to obtain 1.5 parts of methyl(cyclotrimethylene)silyl-group-modified MQ resin.

Analytical results:

1H—nmr (CDCl$_3$): 0.12 (114.11, s), 0.2 (24. 27, s), 0.25 (16.75, s), 1.2 (21.15, m), 1.50 (5.91, m), 1.9 (4.42, m), 3.85 (1.42, br), 4.75 (3.81, br)○ 29Si (1H)—nmr (CDCl$_3$, ppm): −15~−21 (75.12, br), −2~−8 (77.88, br), 4~8 (67.52, br), 8~13 (135.34, br)○ SiO Silicon atoms derived from SiO$_{4/2}$ were detected, but were not analyzed. The polystyrene conversion molecular weight determined by GPC analysis gave a weight-average molecular weight of 1,500 and a number-average molecular weight of 1,100.

Application Example 1 (Curing of methyl (cyclotrimethylene)silyl-terminated diphenylsiloxane oligomer)

2 grams of the methyl(cyclotrimethylene)sily-terminated diphenylsiloxane oligomer obtained in Reference Example 4 were dissolved in 5 grams of toluene to produce a solution in which were dissolved 100 ppm copper(II) acetylacetonate with respect to the diphenylsiloxane oligomer. This solution was cast on a glass plate and was allowed to stand for 30 minutes in open air in order that the toluene would evaporate. The glass plate was then heated for 2 minutes at 150° C. to cure the methyl(cyclotrimethylene)silyl-terminated diphenylsiloxane oligomer. The pencil hardness of this coating film was H.

Application Example 2 (Curing of methyl (cyclotrimethylene)silyl-terminated diphenylsiloxane oligomer)

1 gram of the methyl(cyclotrimethylene)silyl-terminated diphenylsiloxane oligomer obtained in Reference Example 4 was dissolved in 1 ml of ether, and to this solution was added chloroauric acid in the amount of 50 ppm with respect to the diphenylsiloxane oligomer. This solution was cast on a glass plate, and the ether was evaporated in open air. The glass plate was then heated for 2 hours at 50° C. to cure the methyl(cyclotrimethylene)silyl-terminated diphenylsiloxane oligomer. The pencil hardness of this siloxane film was 2B.

Application Example 3 (Curing of methyl (cyclotrimethylene)silyl-terminated dimethylsiloxane oligomer)

1 gram of the methyl(cyclotrimethylene)silyl-terminated dimethylsiloxane oligomer obtained in Reference Example 5 was dissolved in 2 grams of toluene, and to this solution was added copper(II) naphthenate in the amount of 200 ppm with respect to the dimethylsiloxane oligomer. This solution was cast on a glass plate, and the plate was allowed to stand for 30 minutes in open air in order to evaporate the toluene. The glass plate was then heated for 20 minutes at 150° C. to cure the methyl(cyclotrimethylene)silyl-terminated dimethylsiloxane oligomer. The pencil hardness of this siloxane film was B.

Application Example 4 (Curing of a silacyclobutane functional dimethylsiloxane polymer)

0.2 mg of cuprous chloride powder was dispersed in 1.0 gram of the silacyclobutane functional dimethylsiloxane obtained in Reference Example 6, and this solution was heated for 10 minutes at 150° C. A cured material was thus produced from the silacyclobutane functional dimethylsiloxane polymer.

Application Example 5 (Curing of methyl (cyclotrimethylene)silyl-group-modified DT resin) 0.3 grams of the methyl(cyclotrimethylene)silyl-group-modified DT resin obtained in Reference Example 7 was dissolved in 1 gram of toluene to produce a solution in which was dissolved 0.1 mg copper(II) acetylacetonate. This solution was cast on a glass plate and was allowed to stand for 30 minutes in open air so that the toluene would evaporate. The glass plate was then heated for 20 minutes at 150° C. in order to cure the methyl(cyclotrimethylene)silyl -group-modified DT resin. The pencil hardness of the resulting cured material was 2H.

Application Example 6 (Curing of methyl (cyclotrimethylene)silyl-group-modified MQ resin)

0.3 grams of the methyl(cyclotrimethylene)silyl-group-modified MQ resin obtained in Reference Example 8 was dissolved in 0.5 grams toluene to produce a solution in which copper(II) naphthenate was dissolved in the amount of 150 ppm with respect to said resin. This solution was cast on a glass plate and was allowed to stand for 30 minutes in open air so that the toluene would evaporate. The glass plate was then heated for 20 minutes at 150° C. in order to cure the methyl(cyclotrimethylene)silyl-group-modified MQ resin. The pencil hardness of the resulting cured material was B.

Application Example 7 (Curing of methyl (cyclotrimethylene)silyl-terminated diphenylsiloxane oligomer)

2 grams of the methyl(cyclotrimethylene)silyl-terminated diphenylsiloxane oligomer obtained in Reference Example 4 were dissolved in 5 grams of toluene, and this solution was cast on a glass plate and was allowed to stand for 30 minutes in open air so that the toluene would evaporate. The glass plate was then heated for 2 minutes at 150° C. in order to cure the diphenylsiloxane oligomer blocked at both ends with methyl(cyclotrimethylene)silyl groups. The pencil hardness of the resulting cured material was H. In addition, a coating with a pencil hardness of 2H was obtained by heating for 60 minutes at 150° C.

Application Example 8 (Curing of methyl (cyclotrimethylene)silyl-terminated diphenylsiloxane oligomer)

1 gram of the methyl(cyclotrimethylene)silyl-terminated diphenylsiloxane oligomer obtained in Reference Example 4 was dissolved in 1 ml of ether. This solution was cast on a brass plate, and the solvent was evaporated in open air. The plate was then heated for 10 minutes at 150° C. to obtain a cured methyl(cyclotrimethylene)silyl-terminated diphenylsiloxane oligomer. The pencil hardness of the resulting cured material was H.

Application Example 9 (Curing of methyl (cyclotrimethylene)silyl-terminated methylsiloxane oligomer)

The methyl(cyclotrimethylene)silyl-terminated diphenylsiloxane oligomer obtained in Reference Example 5 was applied onto a copper plate, and this was heated for 20 minutes at 150° C. to obtain a cured film with a pencil hardness of B.

Application Example 10 (Curing of silacyclobutane functional dimethylsiloxane polymer)

10 mg of copper powder was dispersed in 1 gram of the silacyclobutane functional dimethylsiloxane polymer obtained in Reference Example 6, and this was heated for 30 minutes at 150° C. to cure the substance, thus producing a rubber.

Application Example 11 (Curing of DT resin modified with methyl(cyclotrimethylene)silyl groups)

2 grams of DT resin modified with methyl (cyclotrimethylene)silyl groups as obtained in Reference Example 7 were dissolved in 5 grams of toluene to produce a solution, which was then cast on a copper plate. The plate was then allowed to stand for 30 minutes in open air to evaporate the toluene before being heated for 10 minutes at 150° C. to obtain a cured DT resin. The pencil hardness of the cured material was 2H. The same experiment was carried out using a brass plate instead of a copper plate, and in this experiment as well, the same coating with a pencil hardness of 2H was obtained.

Application Example 12 (Curing of MQ resin modified with methyl(cyclotrimethylene)silyl groups)

2 grams of MQ resin modified with methyl (cyclotrimethylene)silyl groups obtained in Reference Example 8 were dissolved in 5 grams of toluene to produce a solution, which was then cast on a copper plate. The plate was then allowed to stand for 30 minutes in open air in order to evaporate the toluene. The copper plate was then heated for 20 minutes at 150° C. to cure the MQ resin modified with methyl(cyclotrimethylene)silyl groups. The pencil hardness of the cured film was F.

Application Example 13 (Curing of methyl (cyclotrimethylene)silyl-terminated diphenylsiloxane oligomer)

2 grams of the methyl(cyclotrimethylene)silyl-terminated diphenylsiloxane oligomer obtained in Reference Example 4 were dissolved in 2 grams of toluene. This solution was then spin-coated onto a plastic plate plated with copper strips with widths of 350 μm in a pattern of parallel lines (separation 210 μm). The plate was then allowed to stand for 30 minutes in open air in order to evaporate the toluene. Said plastic plate was then heated for 8 minutes at 150° C. to cure the methyl(cyclotrimethylene)silyl-terminated diphenylsiloxane oligomer. The board was then washed with isopropyl alcohol, and the unhardened diphenylsiloxane oligomer was removed. After drying, the plate was observed and it was clear that the hardened film had formed only at the periphery of the copper pattern.

That which is claimed:

1. A method of curing a siloxane polymer comprising the steps of
   A) mixing
      1) a curable siloxane polymer having the general formula

where A is selected from the group consisting of
   I) compounds having the general formula

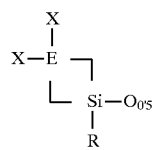

and

II) compounds having the general formula

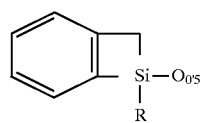

B is selected from the group consisting of

III) compounds having the general formula

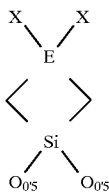

IV) compounds having the general formula

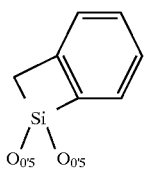

and

V) compounds having the general formula

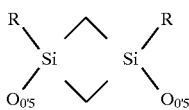

where each R is individually selected from the group consisting of saturated and unsaturated hydrocarbon groups having 1 to 6 carbon atoms, E is selected from the group consisting of a silicon atom and a carbon atom, when E is a silicon atom, X is selected from the group consisting of methyl and phenyl groups, when E is a carbon atom, X is selected from the group consisting of a methyl group or hydrogen atom, the sum of a, b, c, d, e, and f is greater than or equal to 3, the sum of a and b is greater than or equal to 2, and the average content ratios of monomer units with respect to polymer molecule are within the ranges $0.8 \geq a/(a+b+c+d+e+f) \geq 0$ $1.0 \geq b/(a+b+c+d+e+f) \geq 0$ $0.5 \geq c/(a+b+c+d+e+f) \geq 0$ $1.0 > d/(a+b+c+d+e+f) \geq 0$ $1.0 > e/(a+b+c+d+e+f) \geq 0$ $0.65 > f/(a+b+c+d+e+f) \geq 0$; with 2) a catalyst selected from the group consisting of metallic copper, copper alloys, copper compounds, silver compounds, gold compounds and mixtures thereof;

B) heating the resulting mixture for a sufficient time and at a sufficient temperature to cure the mixture.

2. A method of curing a siloxane polymer comprising the steps of

A) contacting 1) a siloxane polymer having the general formula

where A is selected from the group consisting of

I) compounds having the general formula

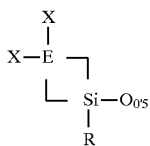

and

II) compounds having the general formula

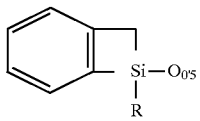

where B is selected from the group consisting of

III) compounds having the general formula

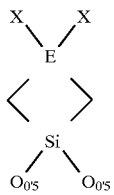

IV) compounds having the general formula

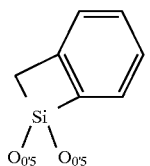

and

V) compounds having the general formula

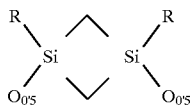

where each R is individually selected from the group consisting of saturated and unsaturated hydrocarbon groups having 1 to 6 carbon atoms, E is selected from the group consisting of a silicon atom and a carbon atom, when E is a silicon atom, X is selected from the group consisting of methyl and phenyl groups, when E is a carbon atom, X is selected from the group consisting of a methyl group or hydrogen atom, the sum of a, b, c, d, e, and f is greater than or equal to 3, the sum of a and b is greater than or equal to 2, and the average content ratios of monomer units with respect to polymer molecule are within the ranges $0.8 \geq a/(a+b+c+d+e+f) \geq 0$ $1.0 \geq b/(a+b+c+d+e+f) \geq 0$ $0.5 \geq c/(a+b+c+d+e+f) \geq 0$ $1.0 > d/(a+b+c+d+e+f) \geq 0$ $1.0 > e/(a+b+c+d+e+f) \geq 0$ $0.65 > f/(a+b+c+d+e+f) \geq 0$; with 2) a metal layer selected from the group consisting of metallic copper layers, copper alloy layers, and copper compound layers; and B) heating the contacted polymer for a sufficient time and at a sufficient temperature to cure the polymer.

3. A cured siloxane obtained by

A) mixing
1) a siloxane polymer having the general formula

where A is selected from the group consisting of
I) compounds having the general formula

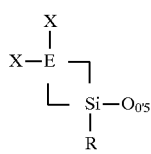

and
II) compounds having the general formula

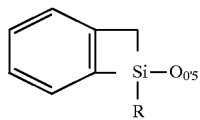

B is selected from the group consisting of
III) compounds having the general formula

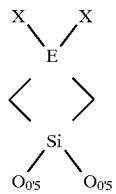

IV) compounds having the general formula

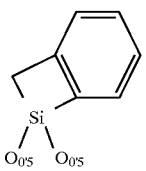

and
V) compounds having the general formula

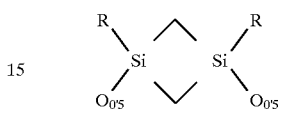

where each R is individually selected from the group consisting of saturated and unsaturated hydrocarbon groups having 1 to 6 carbon atoms, E is selected from the group consisting of a silicon atom and a carbon atom, when E is a silicon atom, X is selected from the group consisting of methyl and phenyl groups, when E is a carbon atom, X is selected from the group consisting of a methyl group or hydrogen atom, the sum of a, b, c, d, e, and f is greater than or equal to 3, the sum of a and b is greater than or equal to 2, and the average content ratios of monomer units with respect to polymer molecule are within the ranges $0.8 \geq a/(a+b+c+d+e+f) \geq 0$
$1.0 \geq b/(a+b+c+d+e+f) \geq 0$
$0.5 \geq c/(a+b+c+d+e+f) \geq 0$
$1.0 > d/(a+b+c+d+e+f) \geq 0$
$1.0 > e/(a+b+c+d+e+f) \geq 0$
$0.65 > f/(a+b+c+d+e+f) > 0$; with 2) a catalyst selected from the group consisting of metallic copper, copper alloys, copper compounds, silver compounds and gold compounds; and B) heating the resulting mixture for a sufficient time and at a sufficient temperature to cure the polymer.

* * * * *